United States Patent [19]

Helmersson

[11] Patent Number: 4,585,614
[45] Date of Patent: Apr. 29, 1986

[54] FUEL ASSEMBLY FOR NUCLEAR REACTOR

[75] Inventor: Sture Helmersson, Kolback, Sweden

[73] Assignee: AB ASEA-ATOM, Västerås, Sweden

[21] Appl. No.: 612,482

[22] Filed: May 21, 1984

Related U.S. Application Data

[63] Continuation-in-part of Ser. No. 315,595, Oct. 30, 1981, abandoned.

[30] Foreign Application Priority Data

Nov. 5, 1980 [SE] Sweden .............................. 80077563

[51] Int. Cl.⁴ .............................................. G21C 3/32
[52] U.S. Cl. ...................................... 376/434; 376/446
[58] Field of Search ................................ 376/434–446, 376/449

[56] References Cited

U.S. PATENT DOCUMENTS

| | | | |
|---|---|---|---|
| 3,104,218 | 9/1963 | Speidel et al. | 376/442 |
| 3,389,056 | 6/1968 | Frisch | 376/442 |
| 4,348,355 | 9/1982 | Nylund | 376/434 |

FOREIGN PATENT DOCUMENTS

| | | | |
|---|---|---|---|
| 1060507 | 7/1959 | Fed. Rep. of Germany | 376/440 |
| 0004986 | 1/1977 | Japan | 376/435 |
| 0040187 | 4/1978 | Japan | 376/434 |
| 1482788 | 8/1977 | United Kingdom | 376/434 |

Primary Examiner—Harvey E. Behrend
Attorney, Agent, or Firm—Pollock, Vande Sande & Priddy

[57] ABSTRACT

A fuel assembly comprises a plurality of fuel rods arranged in a lattice with a combined quadratic and hexagonal geometry, about one-fourth of the total number of fuel rods in the fuel assembly constituting a group of rods at seventeen fuel rod positions among which nine positions are nodal points in a quadratic lattice portion located in the middle of the group.

6 Claims, 4 Drawing Figures

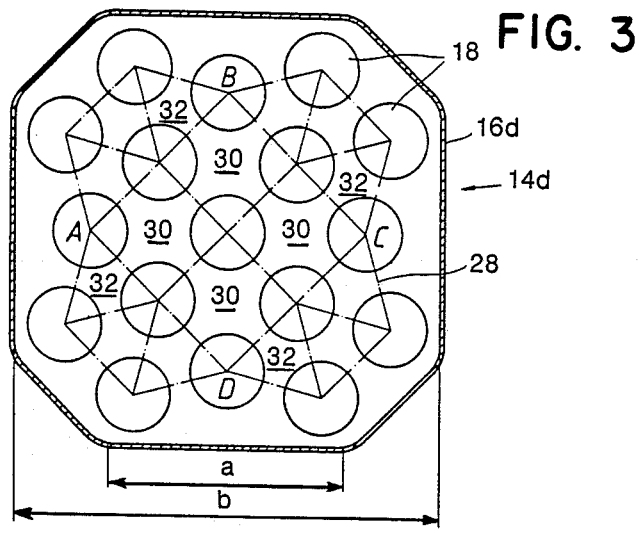
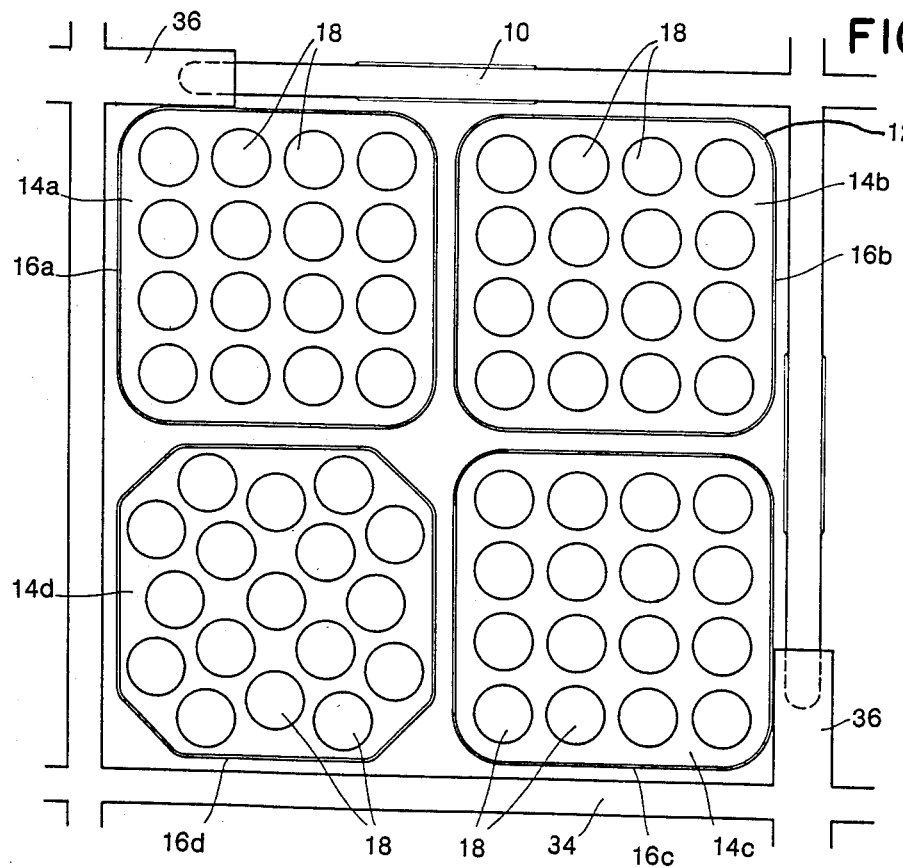

FUEL ASSEMBLY FOR NUCLEAR REACTOR

CROSS REFERENCE TO RELATED PATENT APPLICATIONS

This application is a continuation-in-part of Ser. No. 315,595 filed Oct. 30, 1981 for Fuel Assembly and now abandoned.

DESCRIPTION

1. Technical Field

This invention relates to a fuel assembly for a nuclear reactor, the assembly having a substantially quadratic or square cross-section and comprising four subassemblies of vertically extending fuel rods. Each fuel rod is positioned in a corresponding fuel rod position and all the fuel rod positions of the fuel assembly are nodal points in an imaginary horizontal lattice. Each of the subassemblies comprises about one-fourth of the total number of fuel rods in the fuel assembly and has a substantially quadratic or square cross-section.

2. Background Art

A fuel assembly of this general type is described in U.K. Pat. No. 2054247 B and in U.S. Pat. No. 4,348,355.

According to the present invention, the fuel rods in a subassembly are arranged in a lattice comprising a plurality of squares and a plurality of equilateral triangles. A fuel assembly having a lattice composed of squares and equilateral triangles is known from the German publication DE-OS No. 2656590 which corresponds to the U.K. patent mentioned above. The known fuel assembly is made with circular cross-section, and all of the fuel rods but one are evenly distributed along two concentric circles with a minimum tangential distance between adjacent rods.

SUMMARY OF THE INVENTION

One object of the present invention is to produce a fuel assembly wherein at least one subassembly has a quadratic or square cross-section and comprises about one-fourth of the total number of fuel rods in the fuel assembly. This one subassembly is configured to contain a greater number of fuel rods than are included in known subassemblies having fuel rods with the same dimensions; however, the space required for the subassembly according to the invention is no greater than that of the known subassemblies.

According to the invention, in a fuel assembly of the kind referred to, the lattice of nodal points at which fuel rods are located comprises a plurality of equilateral triangles and a plurality of squares. At least one subassembly among those included in the fuel assembly has seventeen fuel rods at a corresponding number of fuel rod positions, nine of these positions corresponding to one node each in a quadratic lattice portion formed by four of the squares and the remaining eight fuel rod positions corresponding to one node each at corners of equilateral triangles and being positioned outside the quadratic lattice portion with two fuel rod positions located near each side of the quadratic lattice portion.

BRIEF DESCRIPTION OF THE DRAWINGS

The invention will now be described, by way of example, with reference to the accompanying drawings, in which:

FIG. 3 shows a horizontal section through a subassembly of vertical fuel rods which is intended to be included, together with three preferably equal subassemblies, in a fuel assembly of the type shown in FIGS. 1 and 2, each subassembly being arranged in a quadrant of the fuel assembly; and FIG. 4 shows an enlarged, fragmentary sectional view of a reactor core of the type shown in FIG. 1, illustrating in particular a sectional view of a fuel assembly divided into four subassemblies, only one of which has the structure shown in FIG. 3, the other three subassemblies having their fuel rods arranged in a conventional, square lattice.

DESCRIPTION OF PREFERRED EMBODIMENTS

Figure 2:
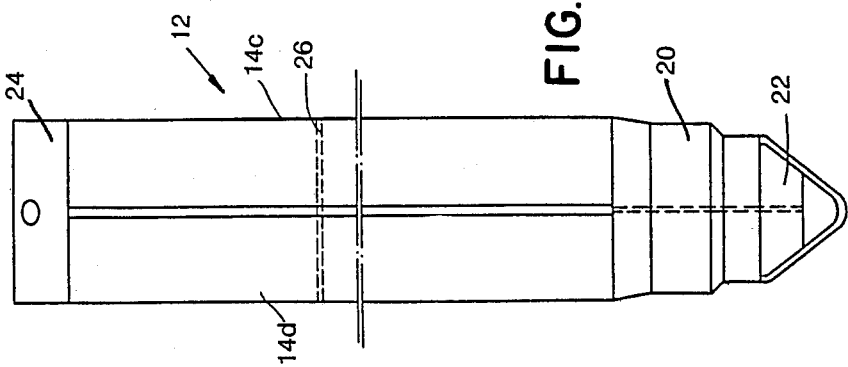
FIG. 2 shows a side elevation view of a fuel assembly according to the invention.

The invention will be described with reference to the drawings, in which like reference numerals identify like elements of structure in each of the several Figures.

Figure 1:
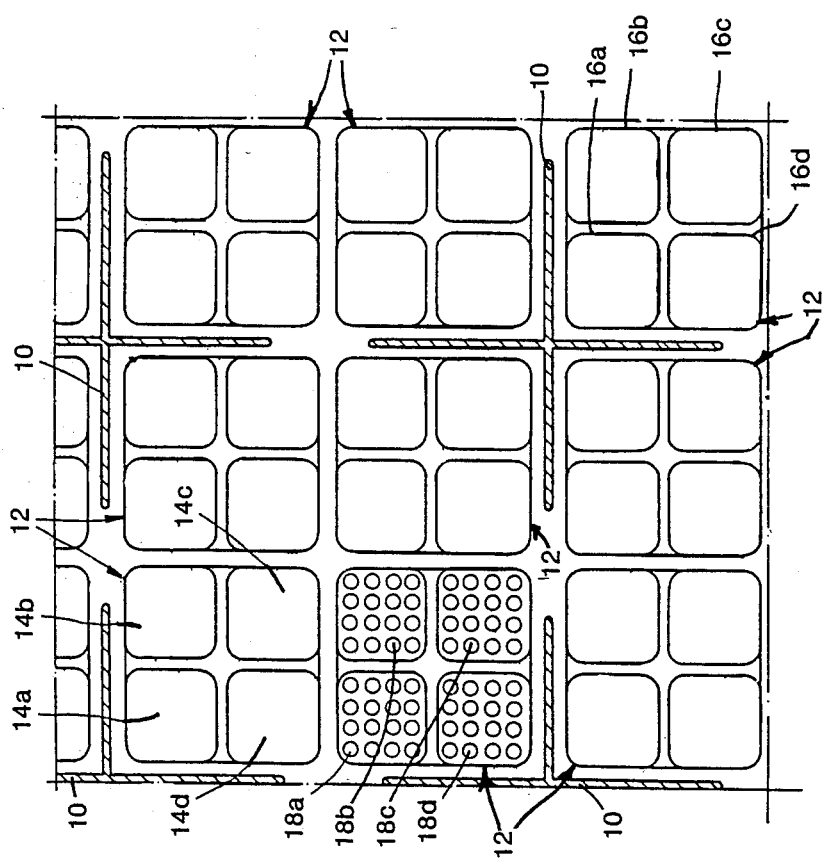
FIG. 1 shows a fragmentary sectional plan view through a reactor core of the type in which fuel assemblies according to the invention may be included.

The reactor core illustrated fragmentarily in FIG. 1 comprises a plurality of cruciform control rods 10, each of which is surrounded by four fuel assemblies 12 having substantially square cross-sections. Each fuel assembly comprises four subassemblies 14a–14d each made up of an essentially quadratic or square fuel box or channel 16a–16d and a partial bundle of vertical fuel rods 18a–18d, each bundle of fuel rods comprising about one-fourth of the total number of fuel rods in the fuel assembly 12. For simplicity, FIG. 1 shows fuel rods in only one fuel assembly. Fuel channels 16a–16d are supported by a common bottom portion 20, as shown in FIG. 2. In use, bottom portion 20 is connected to a fuel assembly support plate within the reactor (not illustrated) and distributes cooling water to all four fuel channels 16a–16d. Preferably, bottom portion 20 comprises a cruciform flow divider 22 which extends down into or through a throttle opening in the bottom portion and the core bottom orifice. At their upper ends, fuel channels 16a–16d are connected to a common top portion 24. Between bottom portion 20 and top portion 24, fuel channels 16a–16d may be connected to each other in one or more places by means of connecting elements 26, shown schematically in FIG. 2. As shown in FIG. 1, each fuel channel 16a–16d may be formed with corners of large radius. Previously known fuel rod supports and spacers (not illustrated) may be used to support bundles 18a–18d within their respective fuel channels.

In FIG. 3, a cross-section through a subassembly 14d shows a fuel box 16d surrounding seventeen vertical fuel rods 18. All positions of the fuel rods, that is, the positions assumed by the vertical central axes of the fuel rods, are marked as nodal points on the drawing, and the dash-dotted lines drawn between these nodal points are auxiliary lines designed to explain the geometric relationship between the fuel rod positions. The auxiliary lines together form a lattice 28 with a fuel rod at each nodal point. A similar lattice can be constructed for all fuel rods in the fuel assemblies 12.

It is clear from FIG. 3 that the lattice 28 contains four mutually equal polygons such as quadratic or square lattice units 30, as well as twelve mutually equal polygons such as lattice units 32 in the form of equilateral triangles. Nine of the seventeen fuel rod positions correspond to one nodal point each in a quadratic lattice portion, the four corners of which are designated A, B, C and D, each of quadratic lattice units 30 constituting one-fourth of the quadratic lattice portion ABCD. There are no nodal points within any of quadratic lattice units 30. The remaining eight fuel rod positions are distributed with two positions at the apexes of triangles 32, outside each of the sides of the quadratic lattice portion, ABCD. Thus, each of the twelve triangular lattice units 32 is positioned outside lattice portion ABCD but has at least one corner point which coincides with a nodal point of lattice portion ABCD. Moreover, eight of triangular lattice units 32 have a side common to a corresponding one of the square lattice units 30. The quadratic lattice portion ABCD is turned 45 degrees with respect to the substantially quadratic cross-section of the fuel box 16d.

FIG. 4 shows a portion of a core grid 34 in a nuclear reactor, the entire grid being made up of a plurality of interconnected squares. The several squares of core grid 34 each correspond to a reactor module made up from four of fuel assemblies 12, whereby each quadrant of a square contains one fuel assembly 12. This one fuel assembly is retained in the correct position by means of two vertical guide bars 36 attached to two adjacent sides of the associated quadrant of the grid square. Gaps for control rod 10 are located between the fuel assemblies 12, as also shown in FIG. 1. A plurality of fuel assemblies 12 in the reactor core are constructed as shown in FIG. 4, that is, with subassembly 14d of the design shown in FIG. 3, and with three subassemblies 14a–14c of a conventional design. The fuel rods 18 in subassembly 14d have exactly the same dimensions as the fuel rods in subassemblies 14a–14c; however, whereas the number of fuel rods is sixteen in the conventional subassemblies 14a–14c, subassembly 14d contains seventeen fuel rods. A fuel assembly according to the invention is preferably only constructed with subassemblies 14d having the structure characteristic of the invention, for example by replacing all the conventional subassemblies 14a–14c shown in FIG. 4 by subassemblies 14d.

By using fuel assemblies comprising subassemblies 14d according to the invention instead of fuel assemblies of a conventional design, the fuel quantity in the core can be increased. As a result, the power density, that is, the power per unit of weight of the fuel, can be reduced at maintained reactor power. This results in improved neutron economy. Reduced power density also results in a reduction of the linear load, that is, the power per unit of length, of the fuel rods, thus reducing the risk of leakage through the casings of the fuel rods.

As will be clear from FIG. 4, by arranging the fuel rods in the lattice shown in FIG. 3, the corners of the fuel box 16d of the subassembly 14d may be bevelled or rounded-off to a greater extent than in the subassemblies 14a–14c of the conventional design. In other words, the plane side surface of the substantially quadratic fuel box 16d has a width a which is considerably smaller than the corresponding dimension of the fuel boxes 16a–16c; whereas, the total width b has one and the same value for both fuel boxes 16a–16c and fuel box 16d. The fuel box 16d is preferably constructed in such a way that the width a constitutes at the most 65% of the total width b of the subassembly 14d. That is, the circumference of fuel box 16d comprises four equally long and pairwise parallel planar side surfaces of width a, the circumferential length of each side surface being at most 65% of the width b between such pairs of side surfaces. In this way, the bulging of the wall of the fuel box, caused by internal overpressure, will be reduced as compared with subassemblies of a conventional design. In certain cases it may be desirable to provide one subassembly with a so-called spacer holder rod, which then replaces a fuel rod. In, for example, the subassembly 14d shown in FIG. 3, the number of fuel rods would then be sixteen, whereas the number of fuel rod positions would remain seventeen. As opposed to the subassemblies 14a–14c, the subassembly 14d has a fuel rod position at its center and therefore, from a mechanical point of view, permits a particularly favorable positioning of a possible spacer holder rod.

Having thus described my invention, what I claim as new, and desire to secure by Letters Patent is:

1. A fuel assembly having a substantially square cross-section, said fuel assembly comprising four subassemblies, each subassembly having only one bundle of vertical rods, each of said bundles including a plurality of fuel rods and at most one spacer holding rod, and comprising about one-fourth of the total number of fuel rods in said fuel assembly; each of said vertical rods having a vertical center line, the total number of said center lines within each of said at least one subassembly being equal to the total number of nodal points in a corresponding imaginary horizontal lattice, each of said center lines coinciding with a corresponding nodal point in said lattice, wherein said lattice comprises only seventeen nodal points, only twelve equilateral triangles and four squares, said triangles and said squares constituting sixteen smaller polygons arranged adjacent to each other without mutual overlap but having some sides in common and in such a way that they together cover the entire area, only, of a twelve-sided, equilateral, greater polygon, said seventeen nodal points coinciding only with the corners of said squares and the corners of said triangles said triangles being mutually equal, said squares being mutually equal, the side of said greater polygon being equal to the side of each of said smaller polygons, each of said four squares having one of its corner points coinciding with a central point in said relatively great polygon as well as with three corner points belonging to the remaining said squares.

2. A fuel assembly according to claim 1, wherein said at least one subassembly is enclosed by a fuel box of substantially square cross-section, said fuel box being rotated 45 degrees with respect to each of said squares.

3. A fuel assembly according to claim 2, wherein said fuel box has a circumference which substantially comprises four equally long and pairwise parallel planar side surfaces, the circumferential length of each said side surface constituting at most 65% of the distance between a pair of said side surfaces.

4. A fuel assembly having a substantially square cross-section and comprising only four subassemblies of vertical rods, each of said fuel assemblies having a bundle of seventeen vertical rods, said bundle including a plurality of fuel rods and at most one spacer holding rod, the rods of each subassembly being positioned in corresponding rod positions, whereby in each of said subassemblies, all rod positions are nodal points in a corresponding imaginary horizontal lattice, each nodal point in said lattice constituting a rod position, each rod position being occupied by a rod, each of said subassemblies comprising about one-fourth of the total number of fuel rods in said fuel assembly and having a substantially square cross-section, wherein the lattice of at least one of said subassemblies comprises seventeen nodal points only and sixteen polygons only, twelve of said polygons being constituted by twelve equilateral and mutually equal triangles, and the remaining four polygons being constituted by four mutually equal squares, the side of said triangles being equal to the side of a said square, nine of said nodal points belonging to a square lattice portion comprised of said four squares only with said nine nodal points being constituted by the nine corners of said four squares of said square lattice, the remaining eight nodal points being constituted by eight corners belonging to eight of said equilateral triangles, said eight triangles being positioned outside said square lattice portion with one side of each triangle coinciding with a side belonging to a corresponding one of said squares.

5. A fuel assembly according to claim 4, wherein said at least one subassembly is enclosed by a fuel box of substantially square cross-section, said fuel box being rotated 45 degrees with respect to said square lattice portion.

6. A fuel assembly according to claim 5, wherein said fuel box has a circumference which substantially comprises four equally long and pairwise parallel planar side surfaces, the circumferential length of each said side surface constituting at most 65% of the distance between a pair of said side surfaces.

* * * * *